United States Patent
Asanuma

(10) Patent No.: US 6,601,310 B2
(45) Date of Patent: Aug. 5, 2003

(54) TRANSFER APPARATUS OF TESTING MASTER BLOCK FOR MEASURING MACHINE

(75) Inventor: Susumu Asanuma, Shizuoka-ken (JP)

(73) Assignee: Asanuma Giken Co., Ltd., Shizuoka-ken (JP)

(*) Notice: Subject to any disclaimer, the term of this patent is extended or adjusted under 35 U.S.C. 154(b) by 140 days.

(21) Appl. No.: 09/937,487

(22) PCT Filed: Jan. 19, 2001

(86) PCT No.: PCT/JP01/00325

§ 371 (c)(1),
(2), (4) Date: Jan. 7, 2002

(87) PCT Pub. No.: WO01/55673

PCT Pub. Date: Aug. 2, 2001

(65) Prior Publication Data

US 2002/0152624 A1 Oct. 24, 2002

(30) Foreign Application Priority Data

Jan. 26, 2000 (JP) ............................. 2000-17583

(51) Int. Cl.⁷ .............................................. G01B 5/004
(52) U.S. Cl. .............................................. 33/502; 33/503
(58) Field of Search ................. 33/502, 503; 73/1.79

(56) References Cited

U.S. PATENT DOCUMENTS 4,594,791 A * 6/1986 Brandstetter ................ 33/503
4,908,951 A * 3/1990 Gurny ......................... 33/503
5,687,489 A * 11/1997 Tondorf et al. .............. 33/503

FOREIGN PATENT DOCUMENTS

| JP | 60-32564 | 9/1985 |
| JP | 02-306101 | 12/1990 |
| JP | 04-220513 | 8/1992 |
| JP | 08-187528 | 7/1996 |
| JP | 11-044527 | 2/1999 |
| JP | 2000-136921 | 5/2000 |
| JP | 2000-136924 | 5/2000 |

* cited by examiner

Primary Examiner—G. Bradley Bennett
(74) Attorney, Agent, or Firm—Browdy and Neimark, P.L.L.C.

(57) ABSTRACT

A transfer apparatus of a testing master block for a coordinate measuring machine which enables a testing master block to be transferred on to a measurement table of the measuring machine quickly without human intervention and can be easily attached to an existing measuring machine with a small installation space, provided with a moving member for moving a testing master block for a measuring machine between a retracted position near an end of a measurement table of the measuring machine and a measurement position on the measurement table. When measuring a workpiece, the moving member or testing master block is retracted to a retracted position to enable the measurement table as a whole to be made effective use of in the measurement work. Between measurement operations of workpieces, the testing master block can be quickly moved and transferred to the measurement position to inspect the accuracy of the measuring machine itself or check the operation.

4 Claims, 11 Drawing Sheets

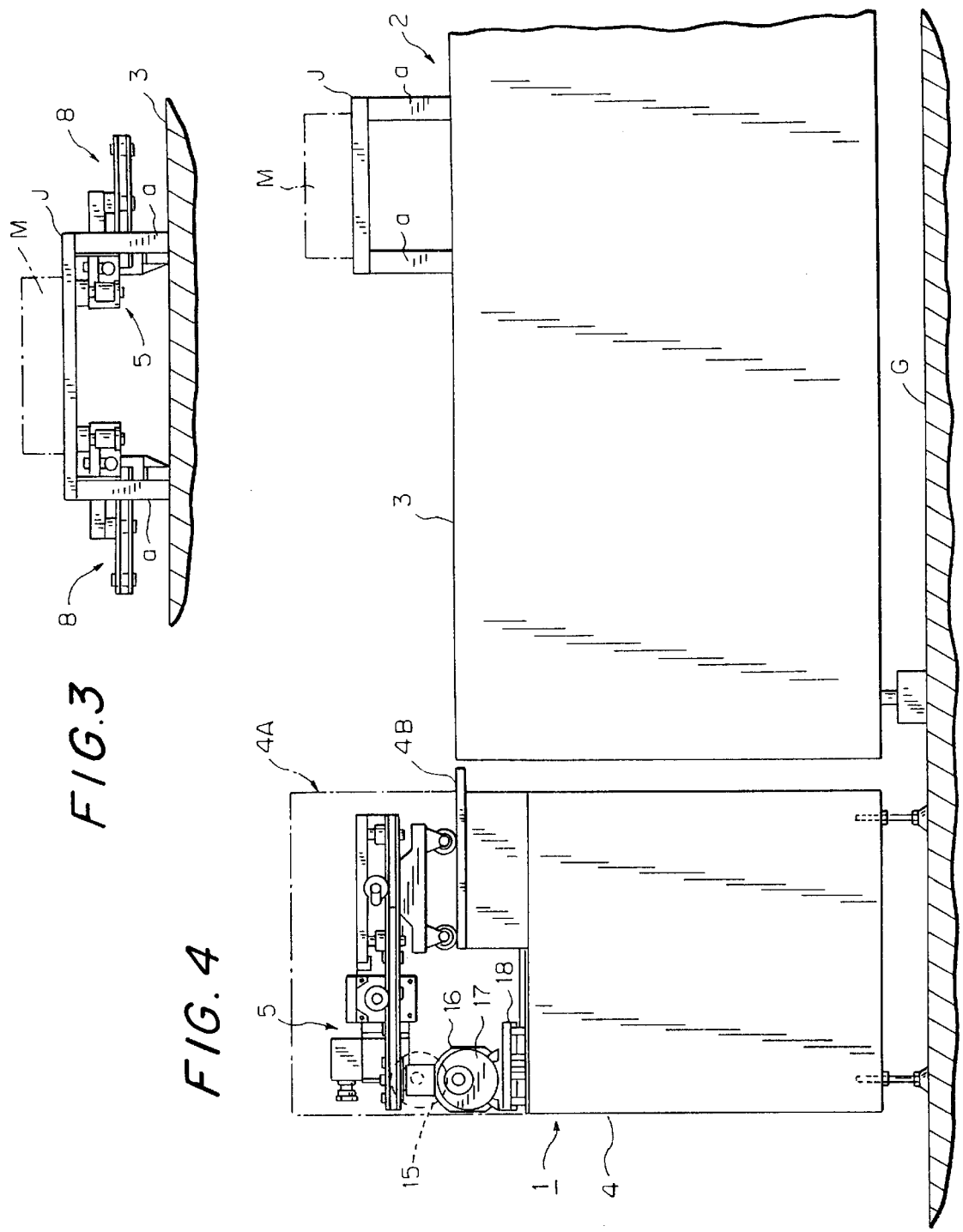

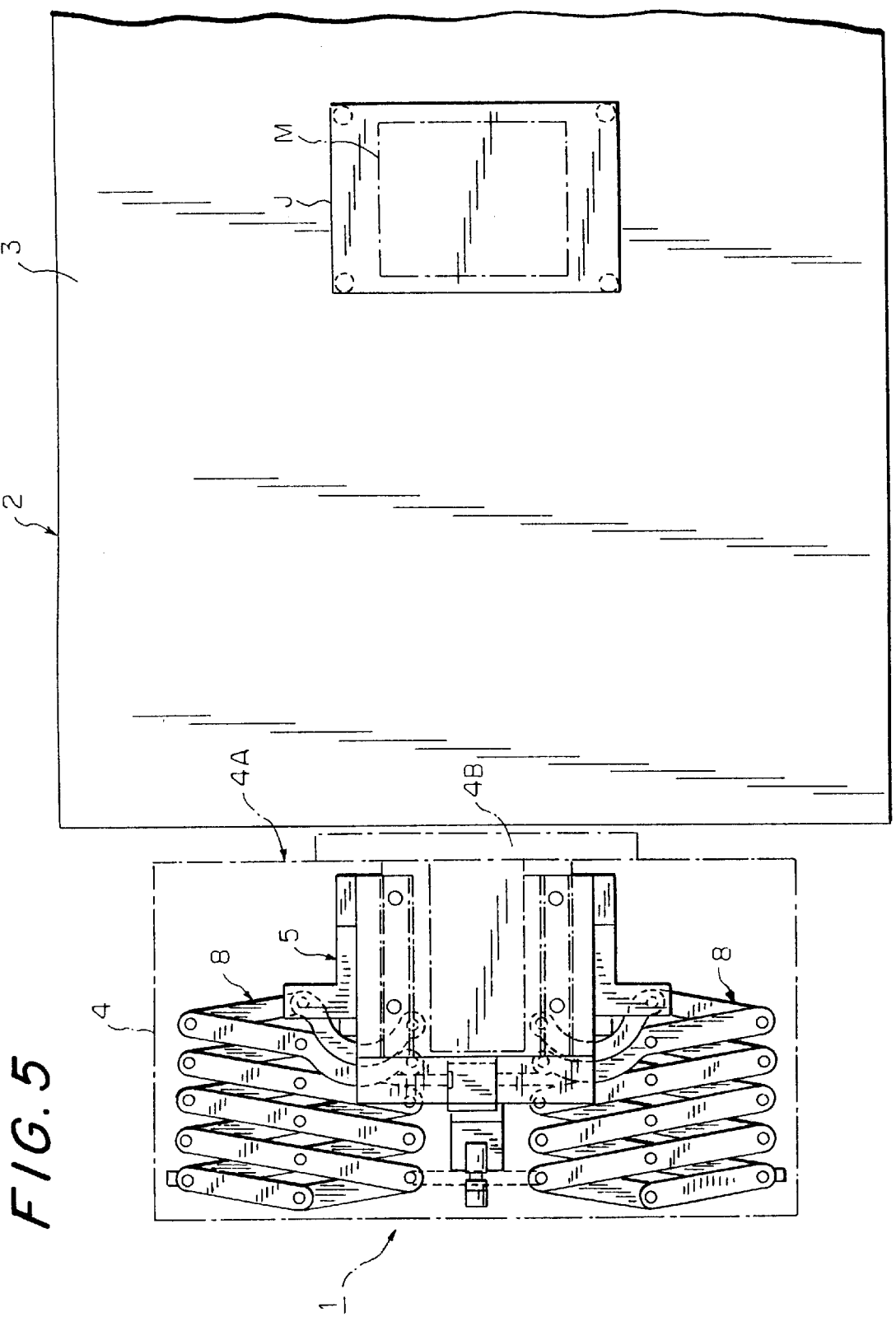

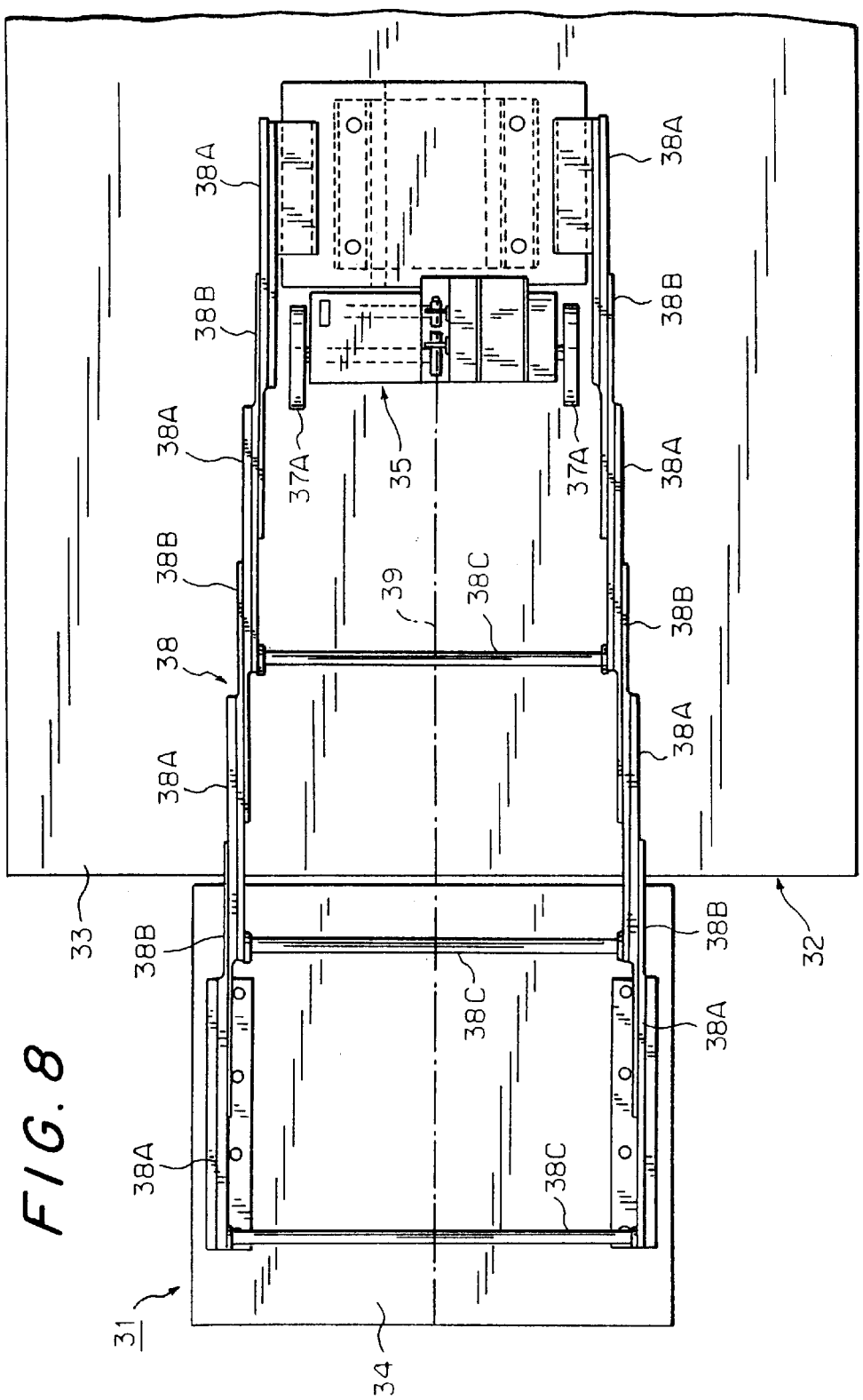

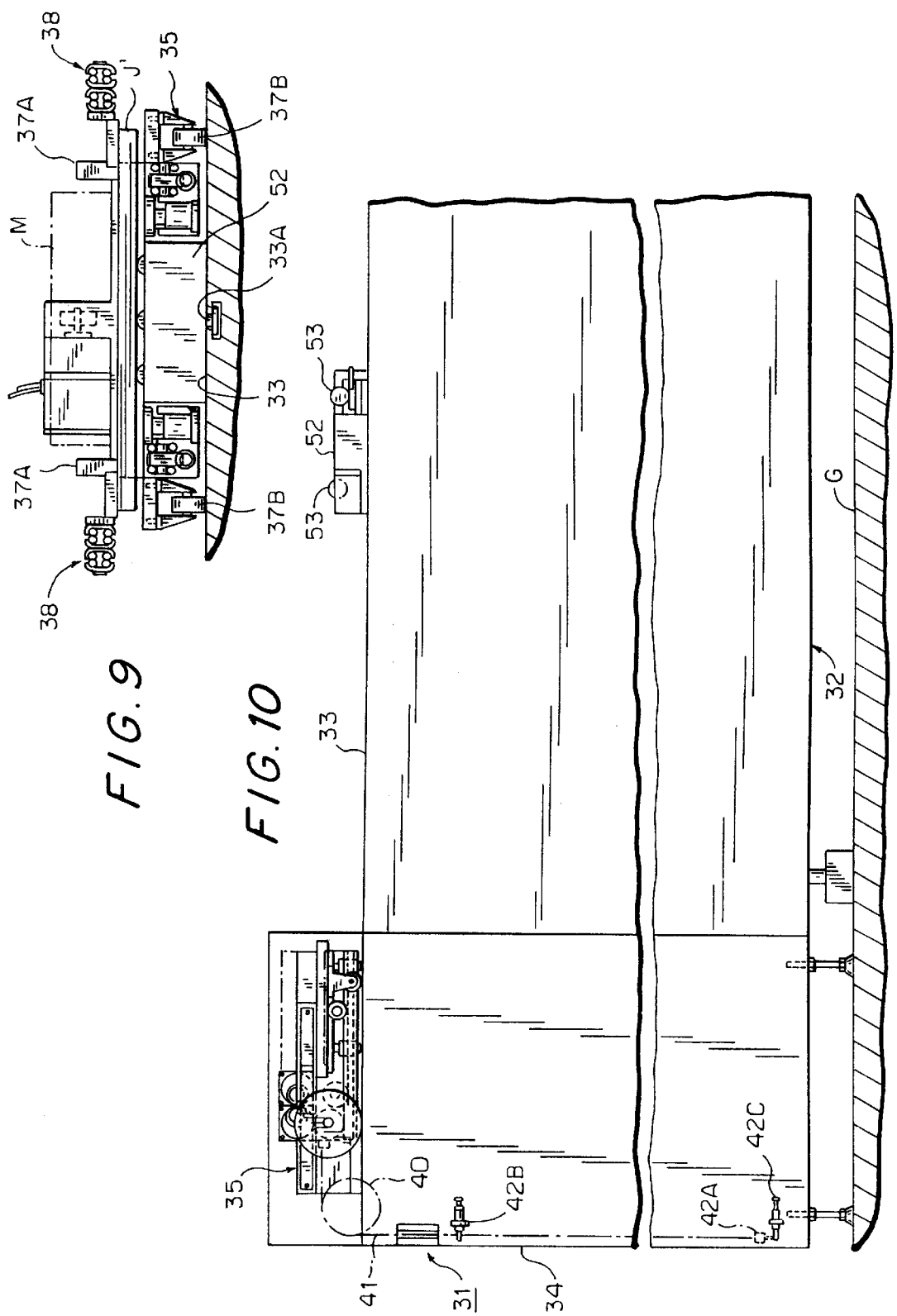

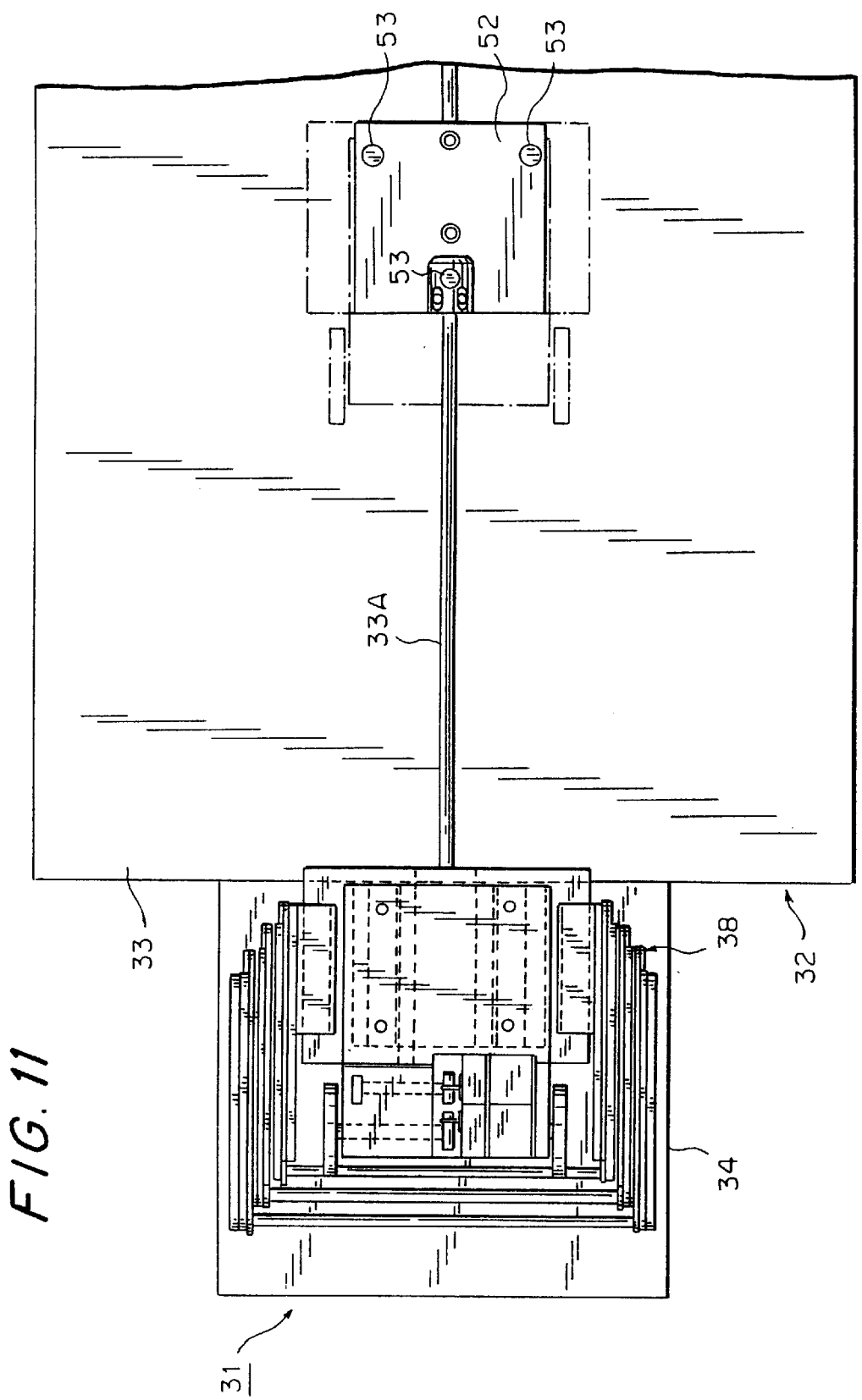

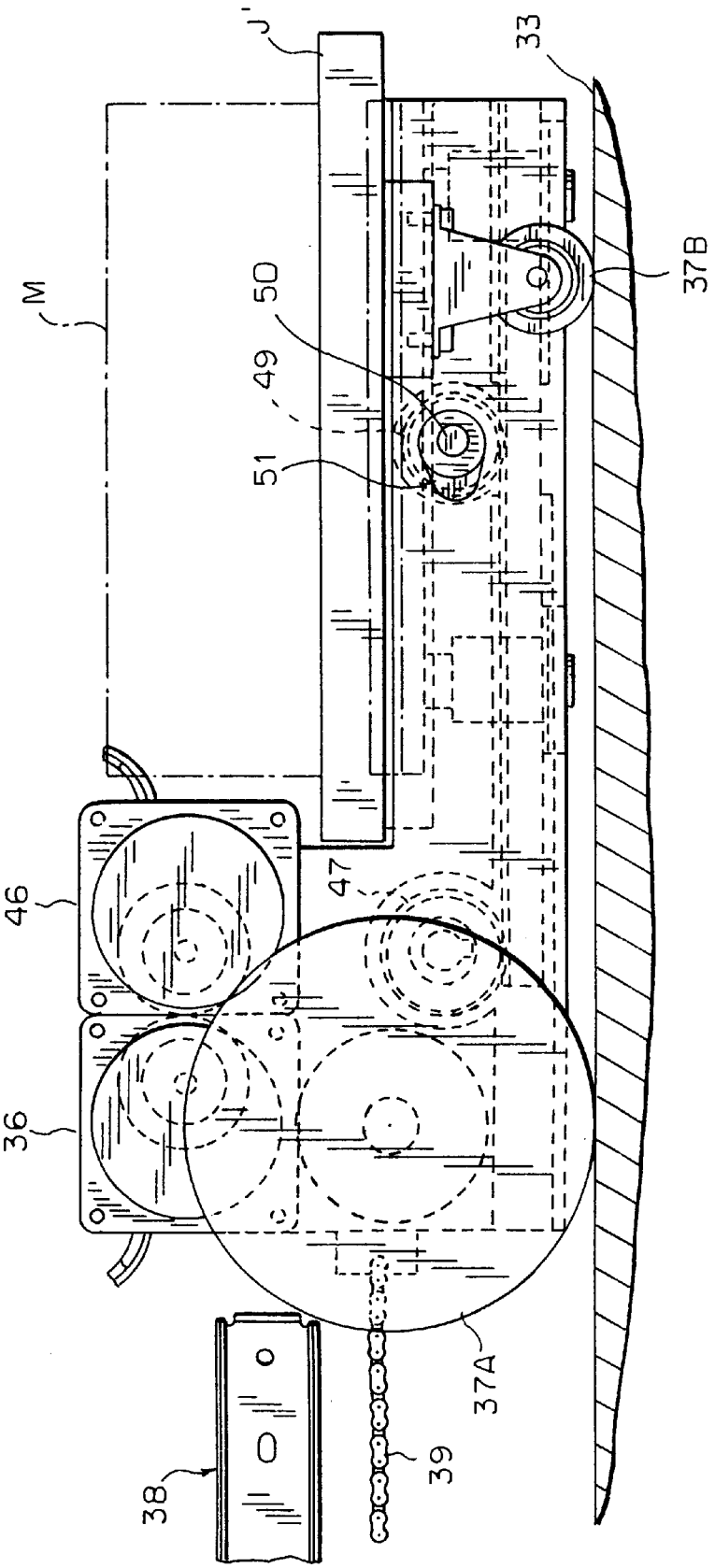

TRANSFER APPARATUS OF TESTING MASTER BLOCK FOR MEASURING MACHINE

REFERENCE TO RELATED APPLICATIONS

The present application is the national stage under 35 U.S.C. 371 of international application PCT/JP01/00325, filed Jan. 19, 2001 which designated the United States, and which international application was not published under POT Article 21(2) in the English language.

BACKGROUND OF THE INVENTION

1. Field of the Invention

The present invention relates to an apparatus for transferring a testing master block, so called an "interim testing artifact" for inspecting accuracy or checking operation to a measurement table of a three-dimensional measuring machine, so called a "coordinate measuring machine" or other measuring machine.

2. Description of the Related Art

In the past, to measure the dimensions of automobile engines or machine parts such as transmission cases, a measuring machine of the type which measured the dimensions by bringing the front end of a probe into contact with a work piece set on a measurement table has been used widely.

As for this type of measuring machine, there is for example the one disclosed in Japanese Unexamined Patent Publication (Kokai) No. 2-306101. As shown in FIG. 13, the measuring machine A1 has a gantry-type moving member A4 moving in the X-direction along rails A3 at the two sides of the measurement table A2. The moving member A4 has attached to it a moving member A5 able to move in a Y-direction perpendicular to the X-direction.

Further, the moving member A5 is provided with a spindle A5 able to move in the vertical direction, that is, a Z-direction perpendicular to the plane formed by the X-direction and Y-direction. A probe (stylus) A6, to which a ball is affixed, is attached to the front end of the spindle AS. The probe A6 is slid in the X- and Y-directions with the ball in contact with the top surface of the work piece W mounted on the measurement table A2 to detect the dimensions in the Z-direction.

In the measuring machine A1, when the ball at the front end of the probe A6 becomes worn, precise measurement of the dimensions becomes no longer possible, so a V-block is set as a reference gauge on the measurement table A2, the ball is brought into contact with it to detect the dimensions of parts of the V-block, for which error due to the wear of the ball is inspected.

Summarizing the problems to be solved by the present invention, in the measuring machine of the related art disclosed in the Japanese Unexamined Patent Publication (Kokai) No. 2-306101, since the reference gauge is set-by hand on the measurement table between ordinary measurement operations, there was the problem that the inspection of the accuracy of the measuring machine itself required time and trouble due to the set-up work, the ordinary work of measurement of the work piece was suspended for a long time for the inspection of accuracy, and therefore the work efficiency ended up dropping.

Further, to eliminate the trouble of setting the reference gauge at the time of each inspection of accuracy, it is possible to place the reference gauge at a predetermined position on the measurement table at all times and move the probe to the position of the reference gauge for measurement only when inspecting the accuracy, but this means the reference gauge will occupy the space of part of the measurement table at all times, so there was the problem that the location where the work piece could be set on the measurement table ended up becoming limited.

On the other hand, the Japanese Unexamined Patent Publication (Kokai) No. 11-44527 discloses the art of using a conveyor designed for conveying a work piece to a measurement position of a coordinate measuring machine so as to move a testing master block serving as a reference in the accuracy of the dimensions to the measurement position and then measuring the dimensions by the measuring machine. According to this coordinate measuring machine, it is possible to automatically transfer the testing master block to the measurement position and thereby inspect the accuracy quickly.

This coordinate measuring machine, however, has a conveyor attached to convey a work piece mounted on a pallet and the testing master block, so installation of the coordinate measuring machine requires a large space with an enclosed air-conditioning system and temperature control system and therefore there was the problem of a higher capital cost.

An object of the present invention is to provide a transfer apparatus of a testing master block for a measuring machine which enables a testing master block to be transferred onto a measurement table of the measuring machine quickly without human intervention and can be easily attached to an existing measuring machine with a small installation space.

DISCLOSURE OF THE INVENTION

To achieve the above objective, according to the present invention, there is a provided transfer apparatus of a testing master block for a measuring machine provided with a moving member for moving a testing master block for a measuring machine between a retracted position near an end of a measurement table of the measuring machine and a measurement position on the measurement table.

Preferably, the moving member is comprised of a trolley moving between a retracted position set inside a storage housing arranged adjoining an end of the measurement table and a measurement position on the measurement table, and the trolley is provided with a lift mechanism having an elevator frame which is driven to be raised or lowered so as to lift up and hold the testing master block at an ascended position and to lower it onto the measurement table by a descending operation.

More preferably, the storage housing and the trolley are connected through pantograph mechanisms comprised of a plurality of pairs of links, each link of a pair pivotally axially attached to the other at a center position, pivotally connected at their ends to ends of adjoining pairs of links, so as to keep the trolley in line; pairs of nuts formed with female threads in mutually opposite directions to each other are axially attached to be changeable in direction to the ends of the pairs of links positioned at the storage housing side of the pantograph mechanisms; these nuts are engaged with pairs of male threads formed in mutually opposite directions at the outer circumference of a drive screw shaft supported by the storage housing and driven to rotate in both the forward and reverse directions; the pantograph mechanisms extend or contract along with rotation of the drive screw shaft; and thereby the trolley is moved between the retracted position inside the storage housing and the measurement position on the measurement table.

Alternatively, a drive source is mounted on the trolley for driving at least one wheel to propel the trolley between the retracted position in the storage housing and the measurement position on the measurement table, and the storage housing and the trolley are connected by a guide member extendable and contractible in the direction of trolley movement so as to keep the trolley in line.

More preferably, a first positioning means is provided at the bottom of the testing master block, and the first positioning means engages from above with a second positioning means fastened detachably at the measurement position of the measurement table to position the testing master block with respect to the measurement table.

The transfer apparatus of a testing master block for a measuring machine of the present invention (hereinafter referred to simply as a "transfer apparatus") has a measurement table (bed) for setting a workpiece and can be used attached to a measuring machine for measuring the dimensions etc. of a workpiece placed on that measurement table.

The measuring machine includes for example a coordinate measuring machine which has a probe able to be moved in the X-, Y-, and Z-directions relative to the measurement table and measures dimensions by bringing the front end of the probe into contact with parts of a workpiece on the measurement table.

The transfer apparatus of the present invention moves the testing master block from the retracted position near an end of the measurement table where it does not interfere with ordinary measurement work to the measurement position on the measurement table by a moving member only when inspecting the measuring machine between ordinary measurement operations of workpieces.

Here, as the testing master block, a box-shaped member formed with high accuracy reference holes or reference surfaces for measurement at the surfaces other than the bottom surface may be used. By measuring the testing master block instead of a workpiece, it is possible to inspect the measuring machine for accuracy or malfunctions.

Further, the measuring machine to which the transfer apparatus of the present invention can be applied is not limited to a coordinate measuring machine. It can also be applied to a machine measuring hardness, a machine measuring surface roughness, etc. so long as measurement is performed with the workpiece placed on a measurement table. For example, in the case of a machine measuring hardness, the testing master block becomes a reference master block of hardness, while in the case of a machine measuring surface roughness, the testing master block becomes a reference master block of surface roughness.

Further, the moving member may take various forms such as a trolley able to move on the measurement table carrying a testing master block, a robot arm with a base end attached to a support at the side of the measurement table of the measurement machine and with a front end holding and moving the testing master block to the measurement position on the measurement table, or an extendable fork holding a testing master block at its front end and extending or retracting to move it between the retracted position near an end of the measurement table and the measurement position on the measurement table.

In particular, when using a trolley for the moving member, by making the trolley move between a retracted position set inside the storage housing and the measurement position on the measurement table and storing the testing master block mounted on the trolley inside the storage housing at the retracted position, it is possible protect the high accuracy, expensive testing master block.

Further, by providing the trolley with a lift mechanism having an elevator frame which lifts up and holds the testing master block from the top surface of the measurement table during movement and lowers it on to the measurement table at the measurement position, transfer of the testing master block to the measurement position on the measurement table becomes easy.

Note that the lift mechanism may be configured by a cam mechanism, screw jack mechanism, fluid cylinder mechanism, etc. operating driven by a motor etc.

Further, the opening of the storage housing through which the trolley enters and exits is preferably provided with a shutter which automatically shuts when the trolley enters the retracted position, a cover which may be manually opened or closed, etc. so as to obstruct entry of dust into the storage housing.

Further, the trolley may be moved through pantograph mechanisms by rotation of a drive screw shaft supported at the storage housing by a motor or other rotation source able to drive rotation in both the forward and reverse directions.

In the pantograph mechanisms, by making pairs of nuts, engaged with male threads formed in mutually opposite directions on the drive screw shaft, move in a direction approaching each other or in a direction moving away from each other when the drive screw shaft is rotated, the pairs of links to which these nuts are axially attached at one end pivot about the position of axial attachment between them. This movement is transmitted to all links to make them extend and contract together.

By this extension and contraction of the pantograph mechanisms, it is possible to make the trolley move along a predetermined path between the retracted position inside the storage housing and the measurement position on the measurement table.

Further, it is possible to mount a motor or other drive source on the trolley and drive at least one of the wheels of the trolley by this drive source so as to propel the trolley between the retracted position inside the storage housing and the measurement position on the measurement table.

In this case, by connecting the trolley and the storage housing by a guide member able to extend and contract in the direction of movement of the trolley so as to guide the movement of the trolley, it is possible to keep the trolley in line.

As the guide member, it is possible to use a member configured by combining a plurality of slide rails to be able to expand or contract in the longitudinal direction or pantograph mechanisms comprised of a plurality of pairs of links, each link of a pair pivotally axially attached at its center position with the other link, pivotally connected at their ends with the ends of adjoining pairs of links.

Further, when transferring a testing master block to a measurement position on the measurement table, to eliminate as much as possible the measurement error due to deviation in the orientation of the testing master block etc., it is possible to provide a first positioning means at the bottom of the testing master block and fasten a second positioning means detachably to the measurement position on the measurement table.

In this case, by engaging the first positioning means at the testing master block moved to the measurement position by the trolley of other moving member with the second positioning means on the measurement table from above, it is possible to transfer the testing master block to the measurement position with a high accuracy in two directions in the horizontal plane and in the height direction.

Here, the first positioning means, for example, may be configured by a jig pallet fastened to the bottom of the testing master block formed with conically shaped positioning depressions at three locations on its bottom surface, while the second positioning means may be configured by a reference base provided with steel balls or ceramic balls or other spherical members or conically shaped projections at positions matching with the conically shaped positioning depressions.

Note that the reference base may be bolted etc. to a T-slot etc. formed for attachment of the jigs etc. to the measurement table of the measuring machine.

Further, instead of the conically shaped positioning depressions, it is possible to form a plurality of elongated positioning holes having widths matching the diameters of the spherical members in the bottom surface of the jig pallet so as to extend in two different directions in the plane parallel to the top surface of the measurement table. Alternatively, it is possible to provide spherical members at the jig pallet side of the testing master block and form positioning depressions or elongated positioning holes in the reference base.

Further, it is possible not to fasten the jig pallet to the bottom of the testing master block, but to directly form positioning depressions or elongated holes in the bottom surface of the testing master block and use the positioning depressions or elongated holes themselves as the first positioning means.

Further, the first positioning means and the second positioning means may be configured using a plurality of groups of knife edges and V-grooves engaging with each other so as to position the testing master block in a plurality of different directions parallel to the top surface of the measurement table and in the height direction.

BRIEF DESCRIPTION OF THE DRAWINGS

FIG. 3 is a front view seen along the arrow direction from the position of the line A—A of FIG. 1;

FIG. 4 is a side view of the state of a trolley moved to a retracted position;

FIG. 5 is a plane view of the state of a trolley moved to a retracted position;

FIG. 8 is a plane view of a second embodiment of a transfer apparatus of a testing master block for a measuring machine of the present invention;

FIG. 9 is a front view seen along the arrow direction from the position of the line A—A of FIG. 7;

FIG. 10 is a side view of the state of a trolley moved to a retracted position;

FIG. 11 is a plane view of the state of a trolley moved to a retracted position;

FIG. 12 is a side view of the detailed structure of a trolley; and

DESCRIPTION OF THE PREFERRED EMBODIMENTS

Figure 1:
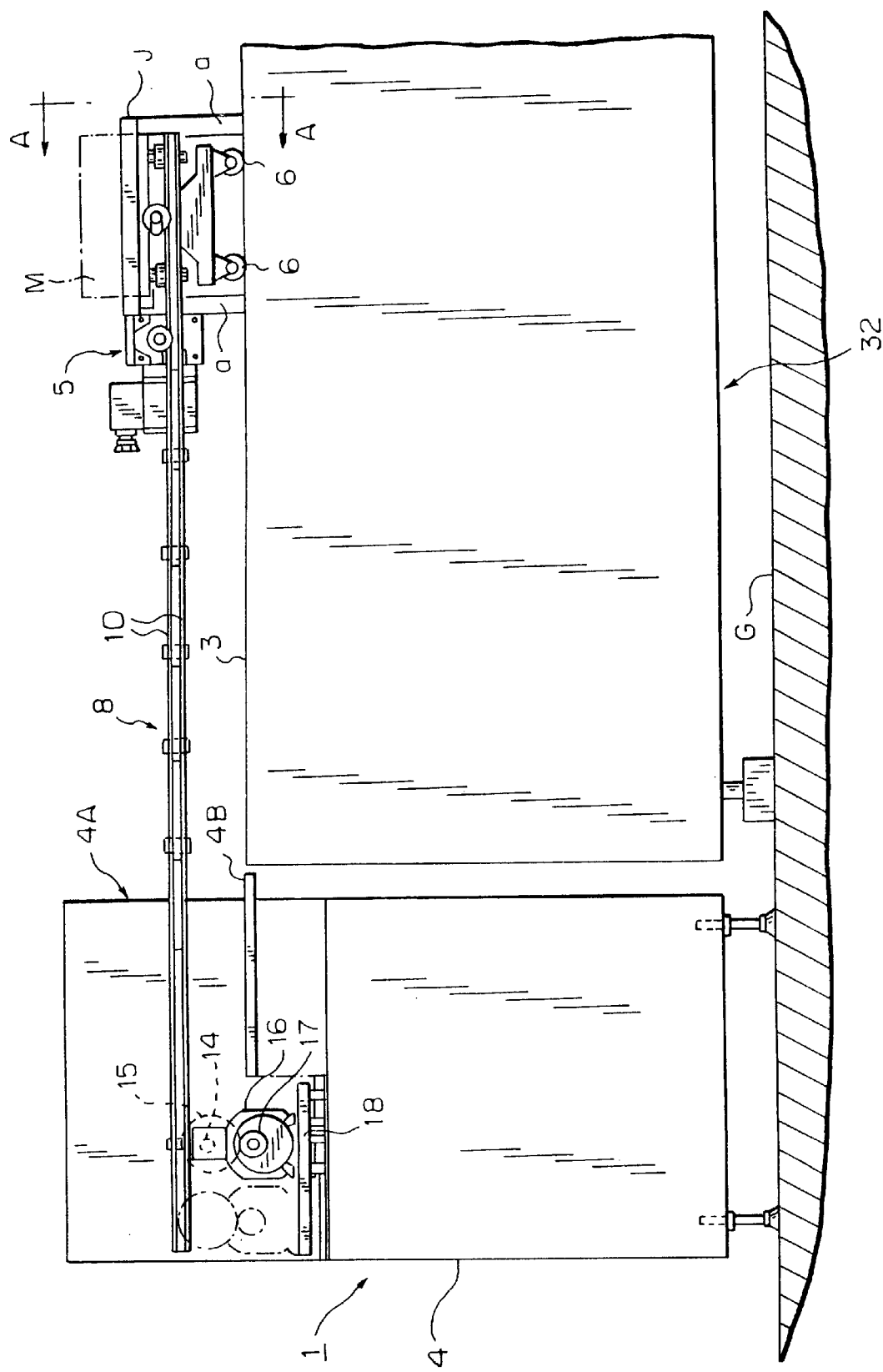
FIG. 1 is a side view of a first embodiment of a transfer apparatus of a testing master block for a measuring machine of the present invention.
Figure 2:
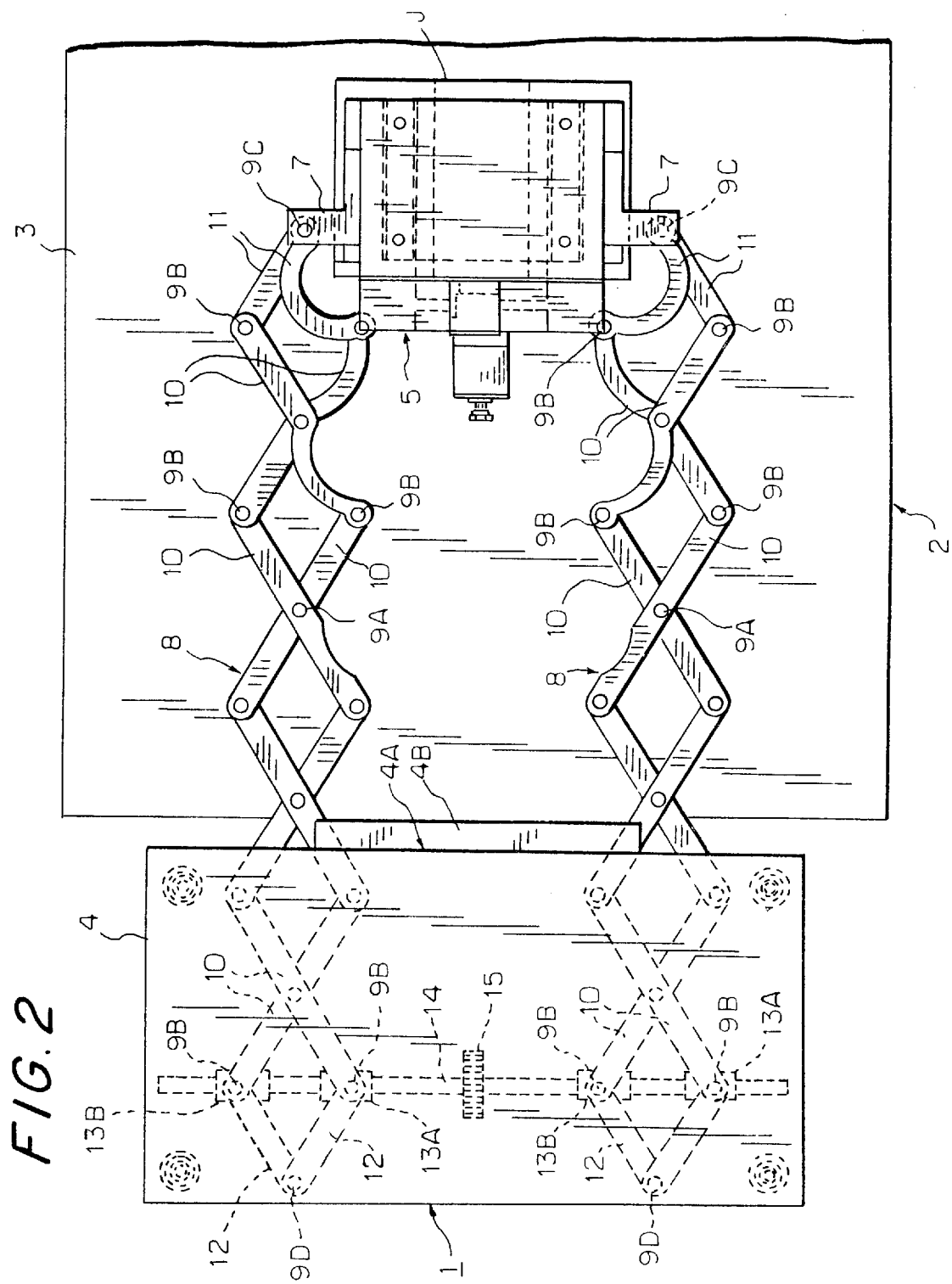
FIG. 2 is a plane view of a first embodiment of a transfer apparatus of a testing master block for a measuring machine of the present invention.

FIG. 1 is a side view of a first embodiment of a transfer apparatus of a testing master block for a measuring machine of the present invention, FIG. 2 is a plane view of the same, and FIG. 3 is a front view seen along the arrow direction from the position of the line A—A of FIG. 1. The transfer apparatus 1 is provided with a storage housing 4 adjoining an end of the measurement table 3 of the measuring machine 2 and fixed to the ground G. and a trolley 5 for moving the testing master block M between a retracted position inside the storage housing 4 and a measurement position on the measurement table 3.

In the present embodiment, while the entire structure is not shown, in the same way as the one shown in the above-mentioned FIG. 1, the measuring machine 2 is a coordinate measuring machine of the type which measures dimensions of parts of a workpiece by bringing a probe, movable in the X-, Y-, and Z-directions, into contact with a workpiece placed on the measurement table 3.

The trolley 5 can freely move on the measurement table 3 by four rotatable wheels 6. As shown in FIG. 2, a pair of mounting brackets 7 projecting out to the left and right sides and fastening members inside the storage housing 4 formed with an opening 4A at the side facing the measurement table 3 are connected by pantograph mechanisms 8.

Each of the pair of pantograph mechanisms 8 is comprised of a plurality of pairs of links 10. Each link in a pair is connected to be able to pivot with respect to the other link in the pair by a connecting pin 9A provided at its center. Each pair of links is pivotally connected at its ends to the ends of the adjoining pairs by connecting pins 9B to form an extendable and contractible assembly.

The pairs of links 10 positioned at the ends of the pantograph mechanisms 8 at the trolley 5 side are pivotally connected by connecting pins 9B with pairs of connecting link pieces 11 pivotally connected by connecting pins 9C to the pair of brackets 7.

Note that in the present embodiment, parts of the links 10 at the side close to the trolley 5 and two connecting link pieces 11 arranged adjoining the left and right sides of the trolley 5 are formed bent into arc shapes to avoid interference with the body of the trolley 5 at the time of a contraction operation of the pantograph mechanisms 8.

Further, the pairs of links 10 positioned at the ends of the pair of pantograph mechanisms 8 at the storage housing 4 side are pivotally connected by connecting pins 9B to the pair of connecting link pieces 12 pivotally connected by connecting pins 9D to members inside the storage housing 4 at the rear end side.

Further, pairs of nuts 13A and 13B are fastened to the connecting pins 9B between the pairs of links 10 positioned at the ends of the pantograph mechanisms 8 at the storage housing 4 side and the connecting link pieces 12.

The nuts 13A and the nuts 13B are formed on their inner circumferential surfaces with female threads running in opposite directions to each other. The nuts 13A and 13B are engaged with pairs of male threads formed in mutually opposite directions on the outer circumference of a drive screw shaft 14 rotatably supported by bearings at its two ends inside the storage housing 4.

The drive screw shaft 14 has a driven gear 15 fastened to it. The driven gear 15 engages with a drive gear 17 fastened to the shaft of a geared motor 16 with a brake able to provide rotational drive power in both the forward and reverse directions.

Note that the drive screw shaft 14 and the geared motor 16 are supported on a movable frame supported so as to be able to freely slide by a slight distance in the same direction as the direction of extension or contraction of the pantograph mechanisms 8 in the storage housing 4. This enables sliding displacement along with the movable frame 18 to follow changes in the positions of the pairs of nuts 13A and 13B due to extension or contraction of the pantograph mechanisms 8.

Therefore, when the geared motor 16 rotates, the rotation is transmitted reduced in speed from the drive gear 17 through the driven gear 15 to the drive screw shaft 14. As a result, the pairs of nuts 13A and 13B engaged with the drive screw shaft 14 move on the drive screw shaft 14 in a direction approaching each other or in a direction moving apart from each other in accordance with the direction of rotation of the drive screw shaft 14.

This being the case, the pairs of links 10 connected to the nuts 13A and 13B open and close about the connecting pins 9A. Along with this, all of the links 10 comprising the pantograph mechanisms 8 and the connecting link pieces 11 and 12 connected to the two ends open and close all together whereby the pantograph mechanisms 8 as a whole extend or contract and the trolley 5 is moved linearly on the measurement table 3.

When the pair of nuts 13A and 13B move in a pair moving apart from each other due to the rotation of the drive screw shaft 14, the pantograph mechanisms 8 contract and, as shown in FIG. 4 and FIG. 5, are folded up in the storage housing 4.

Along with this, the trolley 5 is pulled by the pantograph mechanisms 8, rides up from the top surface of the measurement table 3 over a bridge plate 4B projecting out from the storage housing 4 side to substantially the same height, and is completely stored in the storage housing 4 from the opening 4.

Note that the bridge plate 4B may be made adjustable in length of projection so as to absorb variations in the space between the measurement table 3 and the storage housing 4 arising due to mounting error when installing the transfer apparatus 1 next to the measuring machine on the ground G.

Further, the geared motor 16 for stopping the trolley 5 at both of the measurement position on the measurement table 3 shown in FIG. 1 and FIG. 2 and the retracted position in the storage housing 4 shown in FIG. 4 and FIG. 5 may be controlled for example by detecting the rotational position of the drive screw shaft 14 by a pulse encoder etc.

Figure 6:
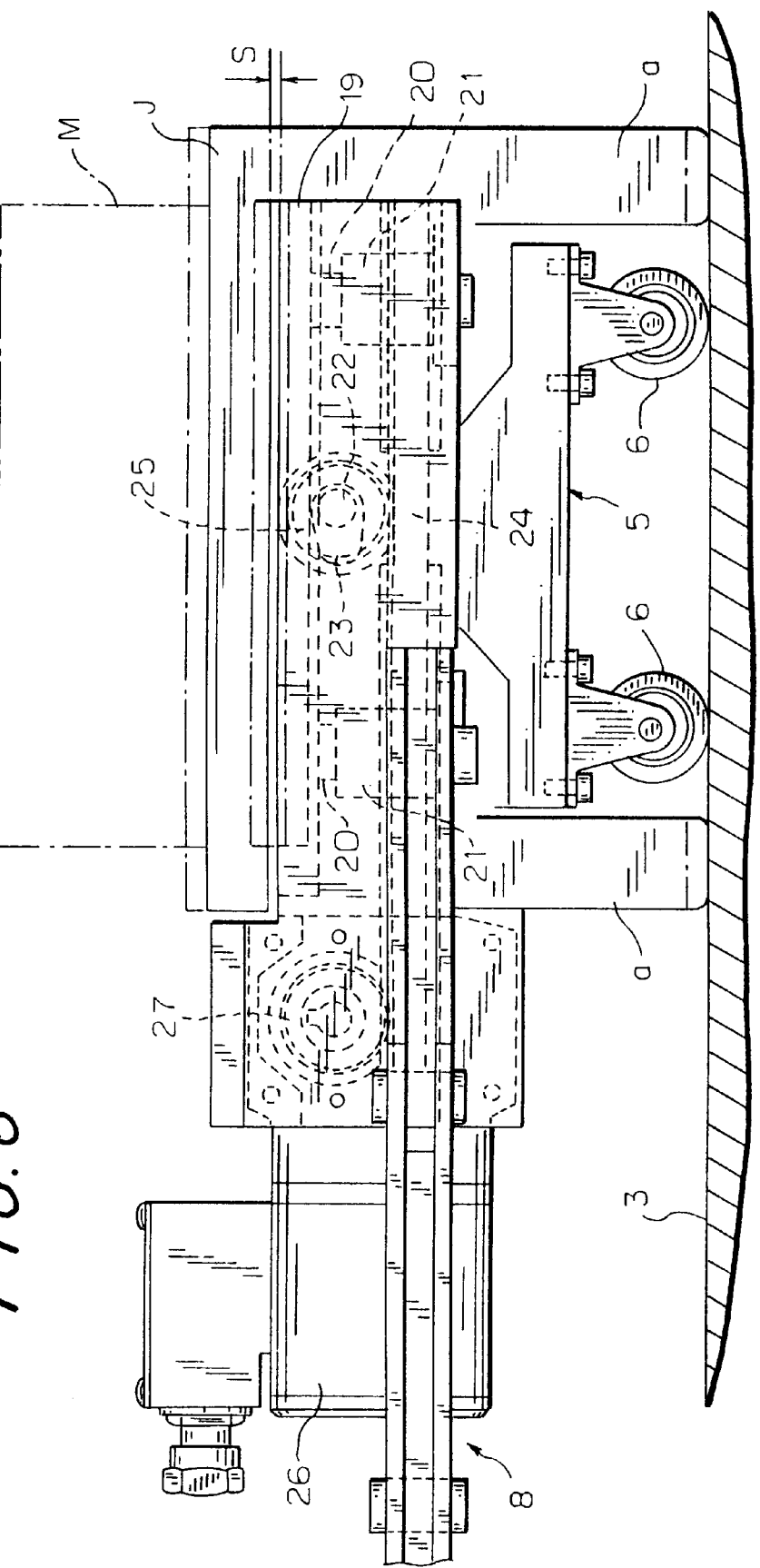
FIG. 6 is a side view of the detailed structure of a trolley.

Next, FIG. 6 is a side view of the detailed structure of the trolley 5. The trolley 5 is provided with an elevator frame 19 for holding in an elevatable manner a jig pallet J to which the testing master block is attached.

The elevator frame 19 is held to be able to ascend or descend relative to the trolley 5 by insertion of guide shafts 20 projecting downward into slide bearings 21 provided at the trolley 5 side.

Further, the elevator frame 19 is supported in weight by abutting at its bottom surface against an eccentric cam 23 fastened to a camshaft 22 rotatably supported at the trolley 5.

Further, the camshaft 22 has fastened to it a driven pinion 25 engaging with a rack 24 supported slidably in the longitudinal direction of the trolley 5.

On the other hand, the rack 24 is engaged with a driven pinion 27 which is driven to rotate in both the forward and reverse directions by a geared motor 26 with a brake mounted on the trolley 5. When the geared motor 26 rotates the drive pinion 27, the rotation is transmitted through the linear motion of the rack 25 to the driven pinion 25, the eccentric cam 23 fastened to the cam shaft 22 rotates, and the elevator frame 19 ascends or descends.

Further, when the elevator frame 19 is at the descended position shown in FIG. 6, a space S arises between the elevator frame 19 and the bottom surface of the jig pallet J. The jig pallet J mounting the testing master block M is supported by legs "a" on the measurement table 3.

Further, when the elevator frame 19 is at the ascended position, the top surface of the elevator frame 19 abuts against the bottom surface of the jig pallet J and lifts this up. The legs "a" of the jig pallet J move away from the top surface of the measurement table 3, and the trolley 5 can move on the measurement table 3 supporting the jig pallet J mounting the testing master block.

Next, an explanation will be given of the operation of the transfer apparatus 1 configured in the above way.

When the measuring machine 2 measures the workpiece on the measurement table 3, as shown in FIG. 4 and FIG. 5, the pantograph mechanisms 8 are in the folded state and stored at the retracted position inside the storage housing along with the trolley 5.

At this time, the testing master block M and the jig pallet J are both supported on the elevator frame 19 of the trolley 5 and stored in the storage housing 4. A not shown workpiece is transferred on the measurement table 3 and measured for dimensions of its parts.

Next, when inspecting the accuracy of the measuring machine 2 between measurement operations of workpieces, the geared motor 16 shown in FIG. 1 is driven and the drive screw shaft 14 is made to rotate in a direction by which the pairs of nuts 13A and 13B shown in FIG. 2 approach each other.

This being so, the links 10 comprising the pantograph mechanisms 8 pivot with respect to each other about the connecting pins 9A to enable the pantograph mechanisms 8 to extend, and the trolley 5 is moved from the retracted position inside the storage housing 4 to the measurement position on the measurement table 3 with the jig pallet J and the testing master block M carried on the elevator frame 19.

At this time, the elevator frame 19 is at the ascended position and the legs "a" of the jig pallet move away from the top surface of the measurement table 3 so as not to obstruct movement of the trolley 5.

When the trolley 5 is moved to the measurement position on the measurement table 3, the geared motor 16 stops, then the elevator frame 19 descends along with rotation of the geared motor 26 shown in FIG. 6 carried on the trolley 5, the jig pallet J is supported by its legs "a" touching down on the top surface of the measurement table 3, and the bottom surface of the jig pallet J moves away from the top surface of the elevator frame 19.

Next, the geared motor 16 is driven in reverse, the pantograph mechanisms 8 contract, the trolley 5 retracts inside the storage housing 4 while leaving the jig pallet J and the testing master block M on the measurement table 3, then the parts of the testing master block M on the jig pallet J lowered onto and transferred to the measurement position on the measurement table 3 are measured by the measuring machine 2 to inspect the accuracy of the measuring machine 2.

After the accuracy of the measuring machine 2 finishes being inspected, as shown in FIG. 1 and FIG. 2 again, the pantograph mechanisms 8 again are extended to move the elevator frame 19 of the trolley 5 below the jig pallet J, then the elevator frame 19 is made to rise to lift up the jig pallet J on which the testing master block M is mounted.

Further, the pantograph mechanisms 8 are made to contract to return the trolley 5 to the retracted position inside the storage housing 4, and then a new workpiece is transferred on to the trolley 5 for the normal measurement work.

Figure 7:
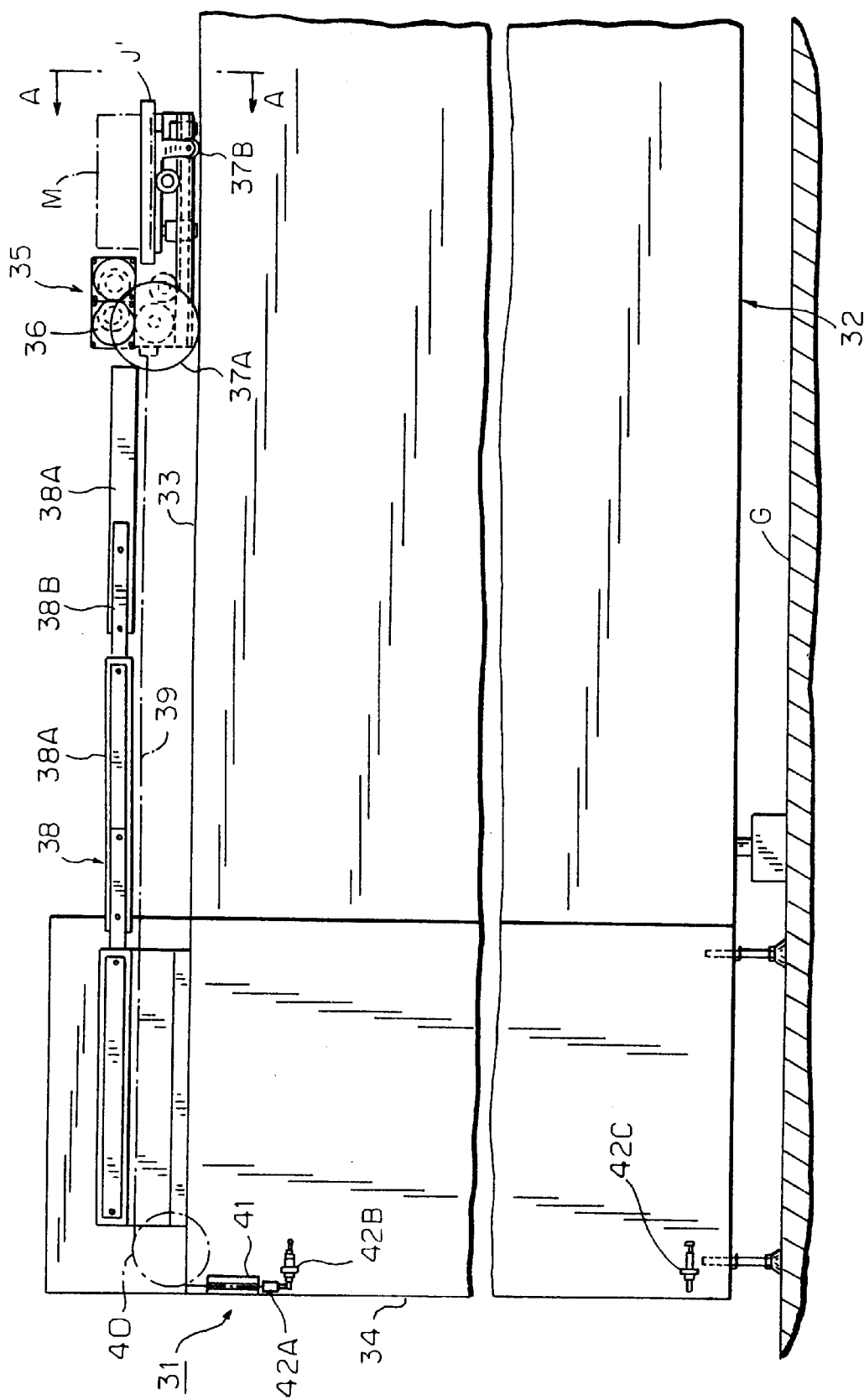
FIG. 7 is a side view of a second embodiment of a transfer apparatus of a testing master block for a measuring machine of the present invention.
Figure 13:
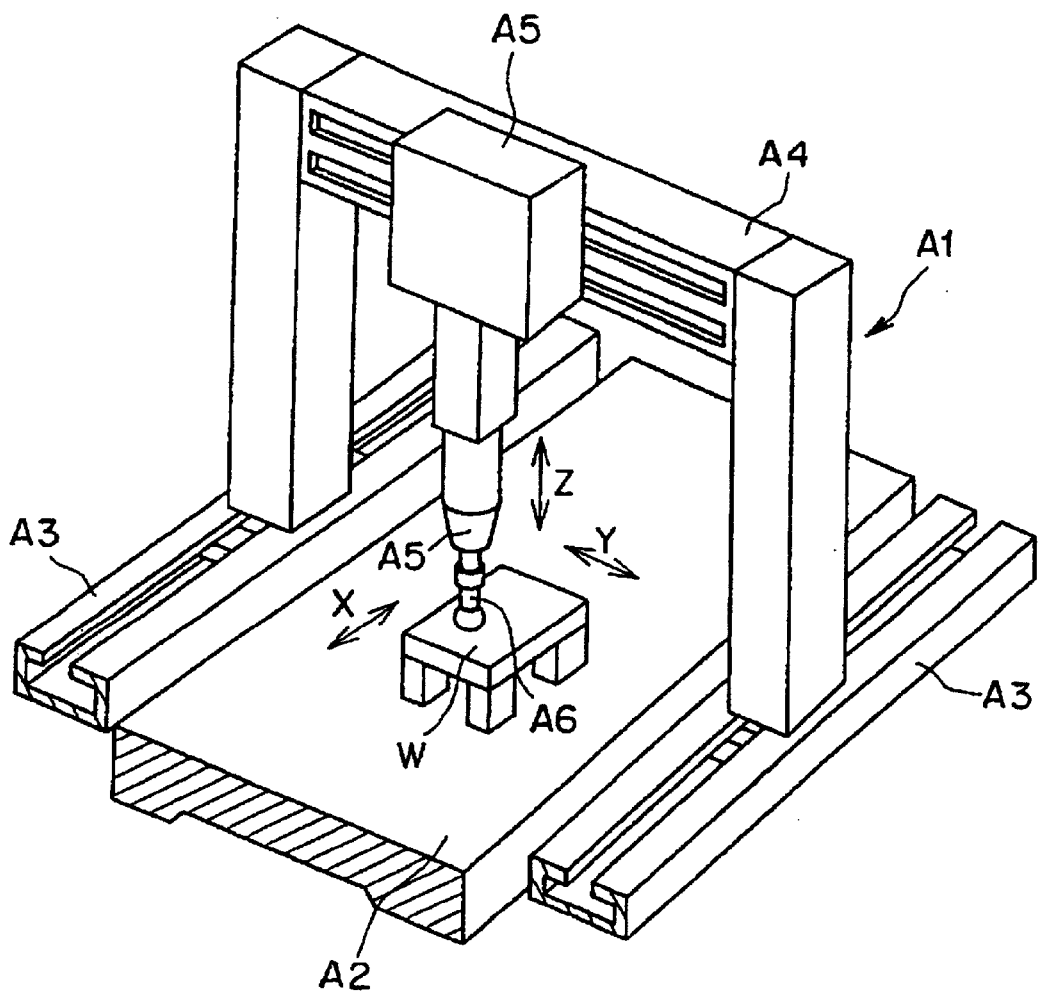
FIG. 13 is a perspective view of an example of a measuring machine provided with a measurement table used in the related art.

Next, FIG. 7 is a side view of a second embodiment of a transfer apparatus of a testing master block for a measuring machine of the present invention; FIG. 8 is a plane view of the same; and FIG. 9 is a front view seen along the arrow direction from the position of the line A—A of FIG. 7. The transfer apparatus 31 is provided with a storage housing 34 adjoining an end of the measurement table 33 of the measuring machine 32 and fixed to the ground G and a trolley 35 for moving the testing master block M between a retracted position inside the storage housing 34 and a measurement position on the measurement table 33.

Here, the measuring machine 32 is a coordinate measuring machine of substantially the same structure as the measuring machine 2 in the first embodiment. In the present embodiment, the trolley 35 can freely move on the measurement table 33 by drive wheels 37A driven using a geared motor 36 with a brake mounted on the body as a source of drive power for travel and support wheels 37B.

Further, the two sides of the body of the trolley 35 and the storage housing 34 are connected by an extendable guide member 38. Note that an opening similar to that of the storage housing 4 of the first embodiment is formed at the side of the storage housing 34 facing the measurement table 33 to allow passage of the trolley 35 and the guide member 38.

The guide member 38 is comprised of pluralities of slide rails 38A and 38B connected slidably with respect to each other in the longitudinal direction and guides the trolley 35 to move straight between the retracted position in the storage housing 3 and the measurement position on the measurement table 33.

The slide rails 38A facing each other at the left and right as shown in FIG. 8 are integrally connected at their rear ends by a connecting rod 38C. Further, the two slide rails 38A adjoining each other in the direction of extension and contraction are slidably engaged from the left and right sides with a single slide rail 38B positioned between them.

Due to this structure, it is possible to shorten the length of the guide member 38 at the time of contraction compared with the length at the time of extension and to store it compactly inside the storage housing 34 along with the trolley 35 as shown in FIG. 10 and FIG. 11.

In the present embodiment, one end of a position detecting chain 39 is connected to a rear end of the trolley 35 to stop the trolley 35 at the retracted position inside the storage housing 35 and the measurement position on the measurement table 33.

The position detecting chain 39 is passed over a guide sprocket 40 provided rotatably at the rear inside the storage housing 34 and a chain guide 41 arranged directly under it to be bent vertically downward. The other end has a detection member 42A attached to it.

The detection member 42A is detected by a position detection sensor 42B provided inside the storage housing 34 when the trolley 35 moves to the measurement position. Further, it is detected by a position detection sensor 42C when it moves to the storage position. The geared motor 36 mounted on the trolley 35 is stopped at those positions by the detection signals of these sensors.

Next, FIG. 12 is a side view of the detailed structure of the trolley 35. The trolley 35 is provided with an elevator frame 43 for holding in an elevatable manner a jig base J to which the testing master block M is attached.

The elevator frame 43 is held to be able to ascend and descend relative to the trolley 5 by insertion of guide shafts 44 into slide bearings 45 provided at the trolley 35 side in the same way as the elevator frame 19 provided at the trolley 5 of the first embodiment.

The elevator frame 43 is configured to transmit the rotation of a geared motor 46 with a brake mounted on the trolley 35 along with the geared motor 36 through a drive pinion 47, rack 48, driven pinion 49, and cam shaft 50 to an eccentric cam 51 so as to be raised or lowered by the eccentric cam 51 in the same way as that of the first embodiment.

Further, in the transfer apparatus 31 of this embodiment, the jig pallet J to which the testing master block M is fastened is formed with conically shaped positioning depressions, not shown, at three locations of its bottom surface.

On the other hand, the measurement table 33 of the measuring machine 32 is formed at its center with a T-slot 33A for fastening the mounting jig holding the workpiece as shown in FIG. 11. Using the T-slot 33A, a reference base 52 is fastened to the measurement position to which the testing master block M is to be transferred.

The top surface of the reference base 52 has arranged on it steel balls 53 at three locations corresponding to the not shown conically shaped positioning depressions formed at the three locations of the bottom surface of the jig pallet J.

These steel balls 53 can be adjusted individually in position in the height direction with respect to the reference base and horizontal plane by screw adjustment mechanisms so that they can precisely mate with the positioning depressions on the bottom surface of the jig pallet J.

Note that in the present embodiment, the jig pallet J formed with the positioning depressions on its bottom surface is used as a first positioning means for precisely transferring a testing master block M to the measurement position of the measurement table 33, while the reference base 52 on which the steel balls 53 are arranged is used as the second positioning means.

Next, an explanation will be given of the operation of the transfer apparatus 31 configured in the above way. When the measuring machine 32 measures a workpiece, as shown in FIG. 10 and FIG. 11, the trolley 35 retracts inside the storage housing 34 along with the jig pallet J. In that state, the plurality of slide rails 38A and 38B comprising the guide member 38 are contracted to overlap at the two sides of the trolley 35 and stored in the storage housing 34.

At this time, it is possible to leave the reference base 52 carrying the jig pallet J fastened at the measurement position on the measurement table 3 and use the reference base 52 to transfer the jig pallet etc. on which the workpiece is fastened to the measurement table 33 and perform the measurement operation. Also, it is possible to remove the reference base 52 and measure the workpiece.

Next, when inspecting the accuracy of the measuring machine 32, the geared motor 36 mounted on the trolley 35 is driven and the trolley 35 is propelled from the retracted position in the storage housing 34 to the measurement position on the measurement table 33.

When the reference base 52 is not attached to the measurement position at that time, the reference base 52 is attached before inspecting the accuracy.

Linked with the movement of the trolley 35, the guide member 38 extends by the sliding of the slide rails 38A and 38B to guide the trolley 35 straight from the retracted position to the measurement position without deviation.

Further, when the trolley 35 moves to the measurement position on the measurement table 33, the detection member 42A suspended from the position detecting chain 39 is raised and detected by the position detection sensor 42B. Based on that detection signal, the geared motor 36 on the trolley 35 stops. At that time, the jig pallet J held on the elevator frame 43 is positioned directly above the reference base 52.

Next, the other geared motor 46 mounted on the trolley 35 is driven, the elevator frame 43 descends, the conically shaped positioning depressions formed at three locations on the bottom surface of the jig pallet J to which the testing master block M is attached engage with the corresponding three steel balls 53 on the reference base 52 to position the jig pallet J on the reference base 52, and the bottom surface of the jig pallet J moves away from the top surface of the elevator frame 43 by the elevator frame 43 descending to the down position.

Next, the geared motor 36 is driven in reverse so that the trolley 35 moves to be retracted inside the storage housing 34 while making the guide member 38 contract, then the dimensions of parts of the testing master block M transferred to the measurement position of the measurement table 34 are measured by the measuring machine 32 and the accuracy of the measuring machine 32 inspected.

After the accuracy of the measuring machine 32 finishes being inspected, the trolley 35 is again moved to the measurement position on the measurement table 34 to make the elevator frame 43 enter beneath the jig pallet J, then the elevator frame 43 is made to ascend to lift the jig pallet J on which the testing master block M is mounted, and the trolley 35 is moved to retract into the storage housing 34, whereby normal measurement work on the measurement table 33 again becomes possible.

Summarizing the effects of the invention, as explained above, according to the aspect of the invention described in claim 1, when measuring a workpiece by the measuring machine, the moving member or testing master block is retracted to a retracted position near an end of the measurement table to enable the measurement table as a whole to be made effective use of in the measurement work. Between measurement operations of workpieces, the testing master block can be quickly moved and transferred to the measurement position to efficiently inspect the accuracy.

Further, according to the aspect of the invention as set forth in claim 2, by making the trolley retract inside the storage housing arranged adjoining to the end of the measurement table of the measuring machine, it is possible to store the testing master block inside the storage housing mounted on the trolley when not using the testing master block and thereby protect the high accuracy, expensive testing master block.

Further, since the transfer apparatus of the testing master block can be configured as an independent unit from the measuring machine, it can be easily attached to various measuring machinery having measurement tables.

Further, by providing the trolley with a lift mechanism having an elevator frame which lifts up and holds the testing master block from the top surface of the measurement table during movement of the testing master block and lowers it on to the measurement table at the measurement position, transfer to the measurement position on the measurement table becomes easy.

Further, according to the aspect of the invention as set forth in claim 3, the pantograph mechanisms can be made shorter in dimensions projecting out to the rear of the measurement table from the storage housing compared with the case of use of an air cylinder system or a rack and pinion mechanism for movement of the trolley since the links are folded together compactly when the mechanisms are contracted and therefore the space required for installation of the transfer apparatus can be reduced.

Further, by using pantograph mechanisms, it is possible to keep the trolley in line and make the trolley move straight between the retracted position and measurement position without the need for provision of a separate guide member.

Further, according to the aspect of the invention as set forth in claim 4, by mounting a drive source on the trolley itself for propelling it, the mechanism for movement of the trolley can be simplified, maintenance becomes easy, and the cost of fabrication can be lowered.

Further, according to the aspect of the invention as set forth in claim 5, it is possible to minimize the measurement error due to deviation in the orientation of the testing master block transferred on to the measurement table.

While the invention has been described with reference to specific embodiment chosen for purpose of illustration, it should be apparent that numerous modifications could be made thereto by those skilled in the art without departing from the basic concept and scope of the invention.

What is claimed is:

1. A transfer apparatus of a testing master block for a measuring machine characterized in comprising a moving member for moving a testing master block for a measuring machine between a retracted position near an end of a measurement table of the measuring machine and a measurement position on the measurement table, said moving member is comprised of a trolley moving between a retracted position set inside a storage housing arranged adjoining an end of the measurement table and a measurement position on the measurement table, and said trolley is provided with a lift mechanism having an elevator frame which is driven to be raised or lowered so as to lift up and hold the testing master block at an ascended position and to lower it on to the measurement table by a descending operation.

2. A transfer apparatus of a testing master block for a measuring machine as set forth in claim 1, wherein said storage housing and said trolley are connected through pantograph mechanisms comprised of a plurality of pairs of links, each link of a pair pivotally axially attached to the other at a center position, pivotally connected at their ends to ends of adjoining pairs of links, so as to keep the trolley in line; pairs of nuts formed with female threads in mutually opposite directions to each other are axially attached to be changeable in direction to the ends of the pairs of links positioned at the storage housing side of the pantograph mechanisms; these nuts are engaged with pairs of male threads formed in mutually opposite directions at the outer circumference of a drive screw shaft supported by the storage housing and driven to rotate in both the forward and reverse directions; the pantograph mechanisms extend or contract along with rotation of the drive screw shaft; and thereby the trolley is moved between the retracted position inside the storage housing and the measurement position on the measurement table.

3. A transfer apparatus of a testing master block for a measuring machine as set forth in claim 1, wherein a drive source is mounted on the trolley for driving at least one wheel to propel the trolley between the retracted position in the storage housing and the measurement position on the measurement table, and the storage housing and the trolley are connected by a guide member extendable and contractible in the direction of the trolley movement so as to keep the trolley in line.

4. A transfer apparatus of a testing master block for a measuring machine as set forth in any one of claims 1 to 3, wherein a first positioning means is provided at the bottom of the testing master block, and the first positioning means engages from above with a second positioning means fastened detachably at the measurement position of the measurement table to position the testing master block with respect to the measurement table.

\* \* \* \* \*